United States Patent [19]

Lu et al.

[11] 4,414,092
[45] Nov. 8, 1983

[54] SANDWICH-TYPE ELECTRODE

[75] Inventors: Wen-Tong P. Lu, Upper St. Clair; Earl R. Garcia, Ingram, both of Pa.

[73] Assignee: The United States of America as represented by the U.S. Department of Energy, Washington, D.C.

[21] Appl. No.: 368,556

[22] Filed: Apr. 15, 1982

[51] Int. Cl.$^3$ .......................... C25B 9/00; C25B 11/12
[52] U.S. Cl. ..................................... 204/294; 204/252; 204/129; 252/425.3; 264/62; 502/101
[58] Field of Search ............................ 204/294, 252; 252/425.3; 264/62

[56] References Cited

U.S. PATENT DOCUMENTS

| 2,062,370 | 5/1934 | Miller | 73/314 |
| 3,174,895 | 3/1965 | Gibson | 428/286 |
| 3,477,940 | 11/1969 | Grangaard | 204/290 R |
| 3,944,686 | 3/1976 | Froberg | 427/228 |
| 4,043,933 | 8/1977 | Breault | 252/425.3 |
| 4,236,993 | 12/1980 | Muller | 204/294 |
| 4,349,428 | 9/1982 | Lu et al. | 204/294 |

Primary Examiner—John F. Niebling
Attorney, Agent, or Firm—R. D. Fuerle

[57] ABSTRACT

Disclosed is an improvement on a method of making an electrode wherein a suspension in a liquid is prepared of a powdered catalyst containing a noble metal, carbon powder and a binder, and the suspension is poured over a carbon substrate dried, compressed and sintered to form a solid catalyst layer bonded to the carbon substrate. The improvement is placing a carbon paper on the catalyst layer prior to compressing. The improved electrode can be used as either a cathode or an anode in a sulfur dioxide depolarized electrolyzer in a process for producing hydrogen from water.

11 Claims, 1 Drawing Figure

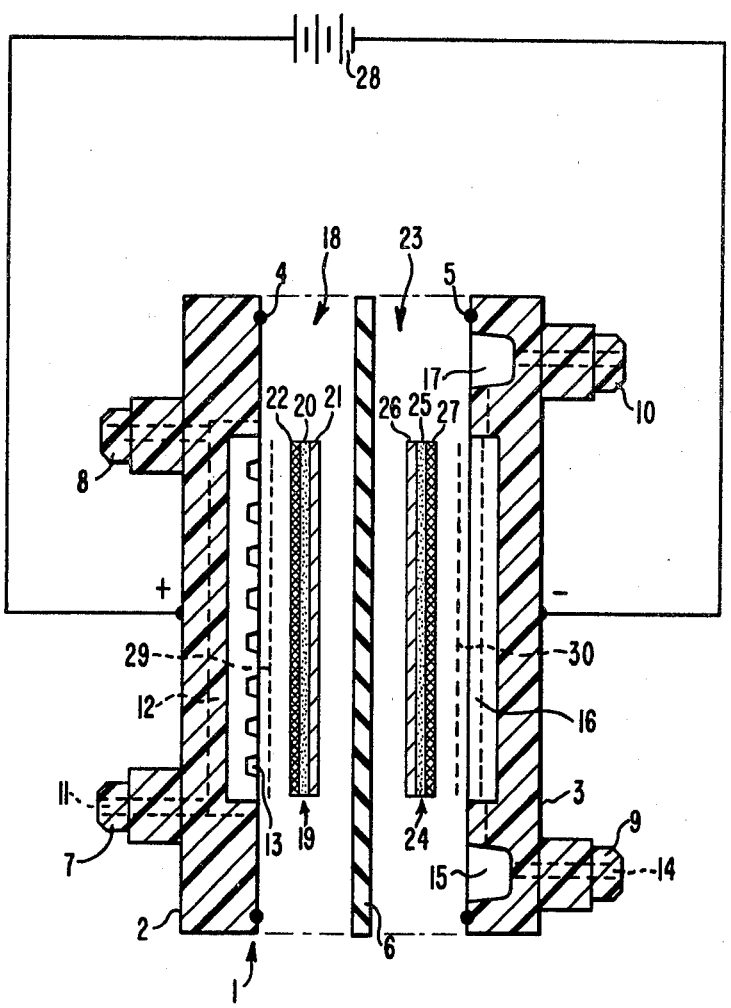

SANDWICH-TYPE ELECTRODE

BACKGROUND OF THE INVENTION

U.S. Pat. No. 3,888,750 discloses a process for decomposing water which involves the following electrolytic reactions:

$$SO_2 + 2H_2O \rightarrow H_2SO_4 + 2H^+ + 2e^- \qquad (1)$$

$$2H^+ + 2e^- \rightarrow H_2 \qquad (2)$$

These reactions take place in an electrolytic cell, the first reaction occurring at the anode and the second reaction at the cathode.

One of the difficulties is making this process efficient has been finding an anode which would be stable in the concentrated sulfuric acid anolyte and which would require as little electrical energy as possible to oxidize the $SO_2$ to sulfuric acid. Until now, the best anode that has been found is the carbon cloth supported electrode disclosed in U.S. patent application Ser. No. 269,135, filed July 1, 1981 by W. T. P. Lu and R. L. Ammon now U.S. Pat. No. 4,349,428. A suspension of platinum, palladium, or palladium oxide, carbon powder, and polytetrafluoroethylene was poured over a carbon cloth. A vacuum on the other side of the cloth removed the water forming a layer of solids on the cloth. The cloth was then compressed and sintered. While it is not mentioned in U.S. Pat. No. 4,349,428, the usual practice was to place a perforated platinum spacer over the top of the cloth to support it in the cell. The purpose of the perforated platinum spacer was to prevent the creeping of a catalyst layer into the grooves of the carbon current collector. While the sheet was necessary to hold the electrode in place, it was expensive and lowered the performance of the cell because it impeded the movement of hydronium ions.

SUMMARY OF THE INVENTION

We have discovered that the platinum spacer previously required on this type of electrode can be eliminated if a sheet of carbon paper is placed over the layer of solids on the electrode prior to compressing the electrode. We have found that the resulting structure is sufficiently rigid to support itself in the cell because the carbon paper permits better ion transfer than did the perforated platinum sheet. The cell operates at a lower voltage at the same current density. The elimination of the perforated platinum spacer lowers the cost of the cell significantly and simplifies cell assembly.

PRIOR ART

U.S. Pat. No. 3,174,815 discloses a method of making graphite cloth laminates.

U.S. Pat. No. 4,236,993 discloses an electrode for water electrolysis made of graphite, polytetrafluoroethylene, and a catalyst on a reinforcing net of metal cloth.

U.S. Pat. Nos. 2,062,370; 3,477,940; and 3,944,686 disclose electrodes produced by coating carbon substrates with carbon powders.

U.S. Pat. No. 4,349,428, filed July 1, 1981 by W. T. P. Lu and R. L. Ammon, entitled "Carbon Cloth Supported Electrode" discloses an electrode upon which the instant invention is an improvement. The instant invention eliminates the perforated platinum spacer, which was not shown in U.S. Pat. No. 4,349,428, and adds a carbon paper to the electrode prior to compression.

DESCRIPTION OF THE INVENTION

The accompanying drawing is a schematic side view of a certain presently-preferred embodiment of a disassembled test cell employing the electrode of this invention.

In the drawing, an electrolyzer 1 is formed of a left portion 2 and a right portion 3 of an inert insulating material such as Lucite or Teflon. The left and right portions are sealed by O-rings 4 and 5 to gas separator 6, which may be, for example, a microporous rubber diaphragm or an ion exchange membrane. Left portion 2 is provided with an anolyte inlet 7 and an anolyte outlet 8, and right portion 3 is provided with a catholyte inlet 9 and a catholyte-and-hydrogen outlet 10. Channel 11 leads from anolyte inlet 7 to anolyte distributor 12 to grooved anodic current collector 13 then to the anolyte outlet 8. Similarly, channel 14 leads from the catholyte inlet 9 to catholyte distributor 15 to cathodic current collector 16 to catholyte reservoir 17 to catholyte output 10. Anode chamber 18 contains an electrode according to this invention 19 which consists of a catalyzed carbon powder 20 sandwiched between carbon substrate 21 and carbon paper 22. Cathode chamber 23 contains another electrode 24, according to this invention. Electrode 24 also consists of a catalyzed carbon powder 25 sandwiched between a carbon substrate 26 and a carbon paper 27. Anode 19 and cathode 24 are connected to the positive and negative terminals, respectively, of a DC power source 28. Items 29 and 30 show the position of the platinum spacer which was used with prior electrodes but is eliminated by the electrode of this invention.

In operation, sulfuric acid solution presaturated with sulfur dioxide enters the electrolyzer by anolyte inlet 7, fills anolyte distributor 12, and passes horizontally through the grooved anodic current collector 13. Simultaneously, the catholyte of sulfuric acid enters catholyte inlet 9, fills catholyte distributor 15, and flows along the vertical channels of the cathodic current collector 16.

By passing a direct current across the anodic current collector 13 and the cathodic current collector 16, sulfur dioxide in the electrolyte is electrocatalytically oxidized at the anode 19, producing sulfuric acid, hydrogen ions, and electrons according to the equation:

$$SO_2 + 2H_2O \rightarrow H_2SO_4 + 2H^+ + 2e^- \qquad (1)$$

The sulfuric acid product and the unreacted sulfur dioxide exit the cell through the anolyte outlet 8, along with the electrolyte. The hydrogen ions move through the separator 6, and recombine with electrons which pass via the external circuit to generate hydrogen gas at the cathode 24 according to the equation:

$$2H^+ + 2e^- \rightarrow H_2 \qquad (2)$$

After being collected in the catholyte reservoir 17, hydrogen gas exits the cell with the electrolyte through the catholyte outlet 10.

While FIG. 1 shows a test cell, an actual commercial cell would employ the same elements in a scaledup version.

The electrode of this invention is formed on a conductive substrate which is stable in concentrated sulfuric acid. Carbon cloth and carbon paper are suitable materials for this purpose, but carbon paper is preferred as it is more rigid. The substrate is preferably about 0.03 to about 0.1 cm. thick as thinner substrates are too porous and may not hold the carbon powder, and thicker substrates increase the inter-electrode spacing which causes the cell voltage to increase. The substrate may be of any width or length, but a typical size is between about 2 inches by 2 inches and about 12 inches by 15 inches. The substrate should preferably have a porosity of about 70 to about 85 volume percent. Before being used to manufacture the electrode, the substrate should be degreased and cleaned to remove any contamination which might be present. In the next step of the invention, a suspension of a catalyzed carbon powder is prepared which contains a fine powdered noble metal, carbon particles, a binder, and a liquid, preferably water, although other liquids may also be used. The noble metal is selected from the elements ruthenium, rhodium, palladium, osmium, iridium, platinum, and gold. Platinum or palladium are preferred as they have higher catalytic activity. Oxides or other compounds of the noble metals may also be used. The noble metal is preferably a very fine powder of about 20 to about 100 angstroms in size. In order to maximize the catalytic activity of the noble metal, the powder must be supported on conductive inert particles of carbon, preferably about 10 to about 18 millimicrons in size. About 5 to about 10 percent by weight of the total of the carbon and catalyst is preferably catalyst, as more catalyst is wasted because its exposed surface area is reduced, and less catalyst means that too much carbon must be used to obtain an adequate loading on the substrate which will result in poor electrolyte penetration. A binder is also needed to hold the catalytic particles on the substrate. Polytetrafluoroethylene is the preferred binder material. Sufficient polytetrafluoroethylene should be used so that it constitutes about 30 to about 45% by weight of the solids in the suspension. If too much binder is used, the conductivity of the electrode is reduced. If too little is used, the solid layer on the substrate begins to fall apart.

In the next step of the process of this invention, the substrate is horizontally supported while the suspension is poured over it. A suitable horizontal support is a perforated stainless steel filter placed on a Lucite holder. It is preferable to apply about 25 to about 50 milligrams of mercury of a vacuum to the other side of the substrate as otherwise the binder and the carbon particles may separate in the solid layer. Sufficient amount of suspension should be poured over the substrate to result in a loading of about 0.5 to about 2 mg/cm$^2$ of the catalyst on the substrate if the electrode is to be used as an anode, and about 0.25 to about 1 mg/cm$^2$ of catalyst on the substrate if the electrode is to be used as a cathode. Less catalyst loading may result in a decrease in the performance of the electrode and, while more catalyst loading will improve the performance, the additional benefit is usually not justified by the additional cost of the catalyst. Once a solid layer has formed on the substrate, the substrate can be removed from its horizontal support.

In the next step of this invention, a carbon paper is placed over the solid layer on the substrate. The carbon paper should be cleaned in much the same way that the substrate is cleaned prior to use to be certain it is not contaminated. The substrate is preferably about 0.05 to about 0.2 cm. thick as thinner substrates are insufficiently rigid and thicker substrates will tend to obstruct the transport of hydronium ions. The carbon paper forms a sandwich structure with the carbon paper on one side, the substrate on the other side and the solid layer in the middle.

In the next step of this invention, the sandwich structure is placed in a dye and compressed, preferably at about 15 to about 30 megapascals (MPa). The structure is then removed from the dye and sintered at the sintering temperature of the binder. If polytetrafluoroethylene is used as the binder, the sintering temperature should be between about 300° and about 360° C. as temperatures over 360° C. result in the decomposition of polytetrafluoroethylene and temperatures under 300° C. require too long a time and may result in the migration of the noble metal catalyst and the loss of its surface area and activity. The purpose of the sintering is to increase the binding ability of the binder. Sintering should be performed in an inert atmosphere, preferably hydrogen, to remove any oxides which may have formed on the catalyst surface. If the catalyst is itself an oxide, however, another inert gas such as nitrogen should be used. Sintering is generally completed in about one-half to about two hours, depending upon the particular temperature selected.

The resulting electrode can be used as a flow by anode or cathode for the oxidation of sulfur dioxide or the evolution of hydrogen in a concentrated sulfuric acid solution generally having a concentration of about 20 to about 60%. Further details on the sulfur cycle water decomposition process in which the electrode of this invention can be used may be found in U.S. Pat. No. 3,888,750, herein incorporated by reference. Further details of the electrode of which the electrode of this invention is an improvement may be found in U.S. patent application Ser. No. 269,135, filed July 1, 1981, herein incorporated by reference.

The following examples further illustrate this invention.

EXAMPLE I

A sheet of carbon cloth 5 cm by 5 cm was degreased in acetone, then placed in an ultrasonic cleaner containing distilled water for 15 minutes. The thickness of the carbon cloth was in the range of 0.03–0.10 cm. Then 0.275 grams of carbon supported platinum catalyst, which consisted of fine platinum particles having a mean particle size of 100 angstroms supported on carbon powder, was poured into a small beaker containing 3 ml distilled water, and the mixture was gently agitated for 2 minutes using a glass stirrer. In a separate beaker, two drops of a wetting agent supplied by Rohm Haas Company under the trade designation "Triton X-100," and 0.137 grams of a polytetrafluoroethylene solution were added to 3 ml of distilled water. This solution was also stirred gently for 2 minutes.

A perforated stainless steel plate (5 cm by 5 cm) was cleaned and inserted into a cavity of a Lucite fixture. The Lucite fixture was positioned in a horizontal plane with the underside of the stainless steel support exposed to a cavity which was connected to a vacuum pump. A sheet of pre-cleaned Teflon filter membrane 5 cm by 5 cm was then placed on the top of the steel support. Subsequently, the pretreated carbon cloth was put on the Teflon filter.

The aqueous polytetrafluoroethylene solution above was poured into the catalyst slurry, followed by gentle stirring for approximately 3 minutes. The resulting mixture was then uniformly spread on the carbon cloth substrate using a small eye dropper. After leaving the deposited mixture to settle for about 1 minute, the vacuum pump was turned on. Depending on the thickness of the carbon cloth, a differential pressure in the range of 25–50 mm-Hg was maintained across the Teflon filter. An infrared lamp was installed above the Lucite fixture to dry in situ the catalyst layer at temperatures ranging from 30° to 35° C.

The resulting catalyst/cloth assembly was dried for 15 minutes, then removed from the Lucite fixture. A sheet of pre-treated carbon paper (0.013 cm in thickness) was placed on the surface of the catalyst layer. Within 15 minutes, the sandwich assembly was transferred into a stainless steel compression die (5 cm by 5 cm) and pressed between two sheets of flat Teflon plates at pressure in the range of 15 to 30 MPa.

After the compressed sandwich assembly was removed from the stainless steel die, it was sintered in a hydrogen furnace at a temperature in the range of 320° to 360° C. for 20 minutes. The platinum loading in the resulting sandwich-type electrode was approximately 1 mg/cm$^2$.

EXAMPLE II

A sheet of carbon paper 5 cm by 5 cm was pretreated following the procedure described in Example I for carbon cloth. The thickness of the carbon paper substrate varied from 0.013 cm to 0.063 cm. By using another sheet of carbon paper with a fixed thickness 0.013 cm, a sandwich-type electrode was prepared on the carbon paper substrate by the process discussed in Example I, except for that no wetting agent was added.

EXAMPLE III

An aqueous solution (100 ml) was prepared by adding 5.0 grams of a carbon-supported platinum catalyst, 2.5 grams of a polytetrafluoroethylene solution, and approximately 10 drops of wetting agent to a flask which contained an appropriate amount of distilled water. The catalyst was composed of 10 weight percent platinum so that the platinum content in the resulting solution was about 5 mg/ml.

After thorough mixing in the flask, the resulting mixture was transferred to a reservoir jar of a sprayer. A sheet of pretreated carbon cloth or carbon paper was mounted on a pre-cleaned stainless steel plate. A small amount of the catalyst solution was sprayed onto the carbon cloth or the carbon paper support followed by a heat treatment at about 60° C. using an overhead infrared lamp. After the catalyst layer had dried, an additional catalyst layer was again applied by spraying. The spraying/drying cycle was repeated until a platinum loading of 1 mg/cm$^2$ was obtained on the support. After removal from the stainless steel plate, another sheet of carbon paper with a fixed thickness 0.013 cm was placed on the catalyst layer. This sandwich-type assembly was finally compressed and sintered, following the procedure as described in Example 1.

The above-described sandwich-type electrodes displayed great electrical conductivity and adequate mechanical strength. The two test electrodes prepared in Examples I and II were evaluated electrochemically as an anode and a cathode, respectively, in an SO$_2$ depolarized electrolyzer using 50 weight percent sulfuric acid at 50° C. and atmospheric pressure. These electrodes were incorporated into the cell such that the carbon paper of thickness 0.013 cm was always in contact with the grooved carbon current collector. At current densities of 200 and 400 mA/cm$_2$, the measured cell voltages (including ohmic losses) were 740 and 990 mV, respectively. Under the identical experimental conditions, an earlier SO$_2$ depolarized electrolyzer which used a carbon cloth supported anode (see patent application Ser. No. 269,135, filed July 1, 1981, now U.S. Pat. No. 4,349,428) and a catalyzed carbon plate cathode, exhibited cell voltages of 770 and 1050 mV at the two current densities mentioned previously. It is obvious that the present invention provides a further improved electrode structure for use in electrolytic cells, particularly for the SO$_2$ depolarized electrolyzers.

In conclusion, a process has been developed for producing porous sandwich-type electrodes for use in electrochemical cells. These electrodes have shown great electrocatalytic activities for SO$_2$ oxidation and hydrogen evolution, respectively. This invention emphasizes the potential use of sandwich-type electrodes in SO$_2$ depolarized electrolyzers so that the expensive metal or alloy spacers can be eliminated.

We claim:

1. In a method of making an electrode wherein a suspension in a liquid is prepared of a powdered catalyst containing a noble metal, carbon powder, and a binder, the suspension is poured over a carbon substrate, dryed, compressed, and sintered to form a solid catalyst layer bonded to said carbon substrate, the improvement comprising placing carbon paper on the surface of said solid catalyst layer prior to said compressing.

2. A method according to claim 1 wherein said carbon paper is about 0.05 to about 0.2 cm thick.

3. A method according to claim 1 wherein said carbon substrate is carbon paper about 0.03 to about 0.1 cm thick.

4. A method according to claim 1 wherein said noble metal is platinum or palladium, and said binder is polytetrafluoroethylene.

5. A method according to claim 1 wherein about 30 to about 45% by weight of the solids in said suspension is said binder and about 5 to about 10% by weight of said noble metal and said carbon powder is said noble metal.

6. A method according to claim 1 wherein the loading of said noble metal on said substrate is about 0.5 to about 2 mg/cm$^2$ for an anode and about 0.25 to about 1 mg/cm$^2$ for a cathode.

7. A method according to claim 1 wherein a vacuum of about 25 to about 50 mm-Hg is applied to the opposite side of said substrate when said suspension is poured over it.

8. A method according to claim 1 wherein said substrate is compressed at about 15 to about 30 MPa and is sintered at about 300° to about 360° C.

9. A method according to claim 1 including the additional last step of placing said electrodes in an electrolyte between current collectors and separators to form a cell.

10. An electrode made according to the method of claim 1.

11. A method according to claim 1 wherein said liquid is distilled water.

* * * * *